United States Patent [19]

Cromer et al.

[11] Patent Number: 5,697,207
[45] Date of Patent: Dec. 16, 1997

[54] COMBINED GAS TURBINE INLET CHILLER, NO$_x$ CONTROL DEVICE AND POWER AUGMENTATION SYSTEM AND METHODS OF OPERATION

[75] Inventors: Robert Harold Cromer, Johnstown; Patrick Robert Dunne, Clifton Park; Jennifer Elise Gill, Scotia; Mark David Seminatore, Ballston Spa, all of N.Y.

[73] Assignee: General Electric Co., Schenectady, N.Y.

[21] Appl. No.: 692,030

[22] Filed: Aug. 2, 1996

[51] Int. Cl.⁶ ............................................. F02C 7/143
[52] U.S. Cl. ........................ 60/39.02; 60/728; 310/54
[58] Field of Search ............................. 60/39.02, 39.12, 60/39.33, 39.461, 39.465, 728; 310/52, 54, 55, 58, 59

[56] References Cited

U.S. PATENT DOCUMENTS

| | | | |
|---|---|---|---|
| 4,250,704 | 2/1981 | Bruckner et al. | 60/39.12 |
| 4,723,407 | 2/1988 | Goebel et al. | 60/39.12 |
| 5,030,863 | 7/1991 | Yoshimura et al. | 310/54 |
| 5,081,845 | 1/1992 | Allam et al. | |
| 5,388,395 | 2/1995 | Scharpf et al. | 60/39.12 |
| 5,421,166 | 6/1995 | Allam et al. | |
| 5,459,994 | 10/1995 | Drnevich | 60/39.12 |

*Primary Examiner*—Louis J. Casaregola
*Attorney, Agent, or Firm*—Nixon & Vanderhye

[57] ABSTRACT

The air inlet to the compressor of a gas turbine is supplied with liquid nitrogen for cooling the ambient inlet air. The heated nitrogen converts to gaseous nitrogen and is supplied to either the combustor to lower the flame temperature and hence reduce NO$_x$ formations within the combustor or the turbine section to increase mass flow and hence increase power output, or both. Liquid nitrogen is also supplied in heat exchange relation with the cooling system of a generator driven by the turbine section. The operating temperature of the generator is thus lowered, thereby increasing its capacity and power. The nitrogen from the heat exchanger of the generator cooling system converts to gaseous nitrogen and is supplied to the combustor for lowered NO$_x$ emissions or to the turbine for improved mass flow, or both.

18 Claims, 1 Drawing Sheet

5,697,207

COMBINED GAS TURBINE INLET CHILLER, NO$_x$ CONTROL DEVICE AND POWER AUGMENTATION SYSTEM AND METHODS OF OPERATION

TECHNICAL FIELD

The present invention relates to a gas turbine and to methods for operating the gas turbine with increased power output and control of NO$_x$. The present invention also relates to apparatus and methods for operating a generator in conjunction with the gas turbine wherein the generator has increased capacity with gas turbine power augmentation and control of NO$_x$.

BACKGROUND

In gas turbine operations, conventional apparatus and methods have been employed to reduce the temperature of the ambient air at the gas turbine inlet, i.e., at the compressor inlet, to obtain additional power output, particularly when operating in a warm ambient environment. As ambient air temperature increases, the density of the air decreases and, accordingly, at full load operation, the output of the gas turbine decreases. Accordingly, a number of different methods have been employed to chill inlet air to the compressor to reduce its temperature and increase its density to obtain increased mass flow and hence power output. For example, evaporation-type systems, such as water chilling, have been used to chill the inlet air. Refrigeration systems have also been used to accomplish this purpose.

Additionally, it is known that NO$_x$ formation increases with increasing flame temperature and with increasing residence time in the combustor. Various systems have been developed to reduce NO$_x$ formation and consequent emissions. For example, water or steam have been injected into the combustion reaction zone to reduce flame temperature. It is important, however, that efforts to increase turbine power output do not result in increased NO$_x$ production. The present invention increases gas turbine output without increasing NO$_x$ formation and, in a preferred form, concurrently reduces NO$_x$ formation with increased power output.

Further, in typical land-based gas turbine operations, the turbine drives a generator. With increased power output from a gas turbine system, there is a need to balance the increased power output of the gas turbine with increased generator capacity so that the generator can accept such power. While marginal increases of power can typically be accepted by a generator, substantial increases of power input to a generator often require substantial investment to increase generator capacity. The present invention, however, increases generator capacity so that it can accept increased power output from its associated gas turbine.

DISCLOSURE OF THE INVENTION

In accordance with the present invention, there is provided a novel and improved gas turbine system and methods of operating which provide for a significant increase in gas turbine power output, a reduction in NO$_x$ formation and emissions and recoupment of low-temperature waste heat in the gas turbine cycle. Additionally, the generating capacity of the generator driven by the gas turbine is significantly increased and balanced with the increased output of the gas turbine. To accomplish the foregoing, liquid nitrogen is provided to reduce the temperature of the air flowing through the compressor and hence provide increased turbine power output. Particularly, and in a preferred form, liquid nitrogen flows through cooling coils disposed at the air inlet to the compressor where ambient air inlet to the compressor is reduced in temperature, i.e., chilled, with consequent increase in turbine power output.

Further, in accordance with the present invention, the nitrogen expanded from its liquid to its gaseous form in the cooling coils is advantageously supplied to the combustor to reduce NO$_x$ formation and/or is supplied to the turbine section, in both cases augmenting the mass flow through the turbine section to further increase turbine power output. Stated differently, the liquid nitrogen is heated and changed in form to a gas simultaneously as the air inlet to the compressor is cooled. The gaseous nitrogen is then injected into the combustor to reduce the formation of NO$_x$, or the gaseous nitrogen is injected into the turbine section of the gas turbine for power augmentation, or both. Thus, in all forms of the present invention, the ambient air inlet temperature is lowered with consequent increase in power output. In one form, the mass flow rate through the turbine is increased by adding gaseous nitrogen directly to the turbine section, combining with the power output enhancement provided by lowering the inlet air temperature, to effect a substantial increase in the overall power output of the turbine. In another form, the increased output derived from lowering the inlet temperature is combined with a reduction in NO$_x$ formation in the combustor and consequent increase in mass flow through the turbine section to enhance power output. Still further, the gaseous nitrogen can be proportioned between the combustor and the turbine section to both reduce NO$_x$ formation and augment power together with the increased power output derived from lowering the inlet temperature. Additionally, the gaseous nitrogen may be heated using waste heat from the turbine or ancillary heat prior to injection into the combustor or turbine section or both to improve turbine performance.

It will also be appreciated that the input to the generator driven by the gas turbine must be balanced with the output of the gas turbine. Generally, a generator follows the performance of a gas turbine in that, as ambient temperature increases, gas turbine and generator output decrease. Conversely, as ambient temperature decreases, gas turbine and generator output increase. Consequently, when ambient temperature decreases, the generator can absorb more heat and handle a higher level of input and therefore increase generator capacity. In accordance with the present invention, the liquid nitrogen is also supplied to the generator cooling system in heat exchange relation therewith which effectively places the generator in a colder operating environment. Particularly, the liquid nitrogen is expanded in heat exchange relation with the conventional cooling medium of the generator so that the generator operates in a cooler environment. The expanded or gaseous nitrogen exiting the heat exchanger of the generator may then be employed similarly as previously described, i.e., provided the combustor to reduce NO$_x$ formation and emissions or provided the turbine section to increase mass flow for increased power output, or both.

The present invention is particularly useful for operations in relatively high ambient temperatures such as encountered during summertime. As temperatures decrease, however, icing occurs in the compressor inlet and, therefore, the chiller may not be operated in low ambient temperatures. However, in a winter peaking market where supplies of liquid nitrogen are readily available, heat, for example, from a steam turbine condensor or some other source of heat can be used to heat the liquid nitrogen, changing it to gaseous form for either NO$_x$ reduction in the combustor or flow augmentation in the turbine, or both.

In a preferred embodiment according to the present invention, there is provided a method of operating a gas turbine having a compressor section, a combustor and a turbine section comprising the steps of disposing liquid nitrogen in heat exchange relation with air flowing through the compressor section to reduce the temperature of the air flowing therethrough and expand the liquid nitrogen to gaseous form and supplying the gaseous nitrogen to at least one of (i) the combustor to reduce the formation of $NO_x$ within the combustor and (ii) the turbine section, thereby to increase gas turbine power output.

In a further preferred embodiment according to the present invention, there is provided a method of operating a power generating system including a generator and a gas turbine having a compressor section, a combustor and a turbine section coupled to the generator and wherein the generator has a cooling system comprising the steps of disposing liquid nitrogen in heat exchange relation with the cooling system of the generator to cool the generator and expand the liquid nitrogen to gaseous form and supplying the gaseous nitrogen to at least one of (i) the combustor to reduce the formation of $NO_x$ within the combustor and (ii) the turbine section, thereby to increase gas turbine power output.

In a still further preferred embodiment according to the present invention, there is provided a gas turbine comprising a compressor section, a combustor for receiving compressed air from the compressor section, a turbine section for receiving hot gases of combustion from the combustor, a supply of liquid nitrogen, a heat exchanger for receiving liquid nitrogen from the supply thereof and placing the liquid nitrogen in heat exchange relation with air flowing through the compressor section to reduce the temperature of the air flowing therethrough and expand the liquid nitrogen to gaseous form and means for supplying the gaseous nitrogen to at least one of (i) the combustor to reduce the formation of $NO_x$ within the combustor and (ii) the turbine section, thereby to increase gas turbine power output.

In a still further preferred embodiment according to the present invention, there is provided a power generating system comprising a gas turbine having a compressor section, a combustor for receiving compressed air from the compressor section and a turbine section for receiving hot gases of combustion from the combustor, a generator having a cooling system and coupled to the turbine section, a supply of liquid nitrogen, a heat exchanger for receiving liquid nitrogen from the supply thereof and placing the liquid nitrogen in heat exchange relation with the cooling system of the generator to cool the generator and expand the liquid nitrogen to gaseous form and means for supplying the gaseous nitrogen to at least one of (i) the combustor to reduce the formation of $NO_x$ within the combustor and (ii) the turbine section, thereby to increase gas turbine power output.

Accordingly, it is a primary object of the present invention to provide novel and improved apparatus and methods of operating a gas turbine to improve turbine power output by cooling compressor inlet air and supplying gaseous nitrogen to the turbine section to augment the mass flow or to afford $NO_x$ control via diluent injection of the gaseous nitrogen into the combustor, or both. It is also another object of the present invention to increase generator power output by increasing the cooling capacity of the generator by supplying liquid nitrogen in heat exchange relation with the cooling system of the generator and flowing the resulting gaseous nitrogen to the turbine combustor to reduce $NO_x$ formation or to the turbine section to increase mass flow and hence power output, or both.

BEST MODE FOR CARRYING OUT THE INVENTION

Figure 1:
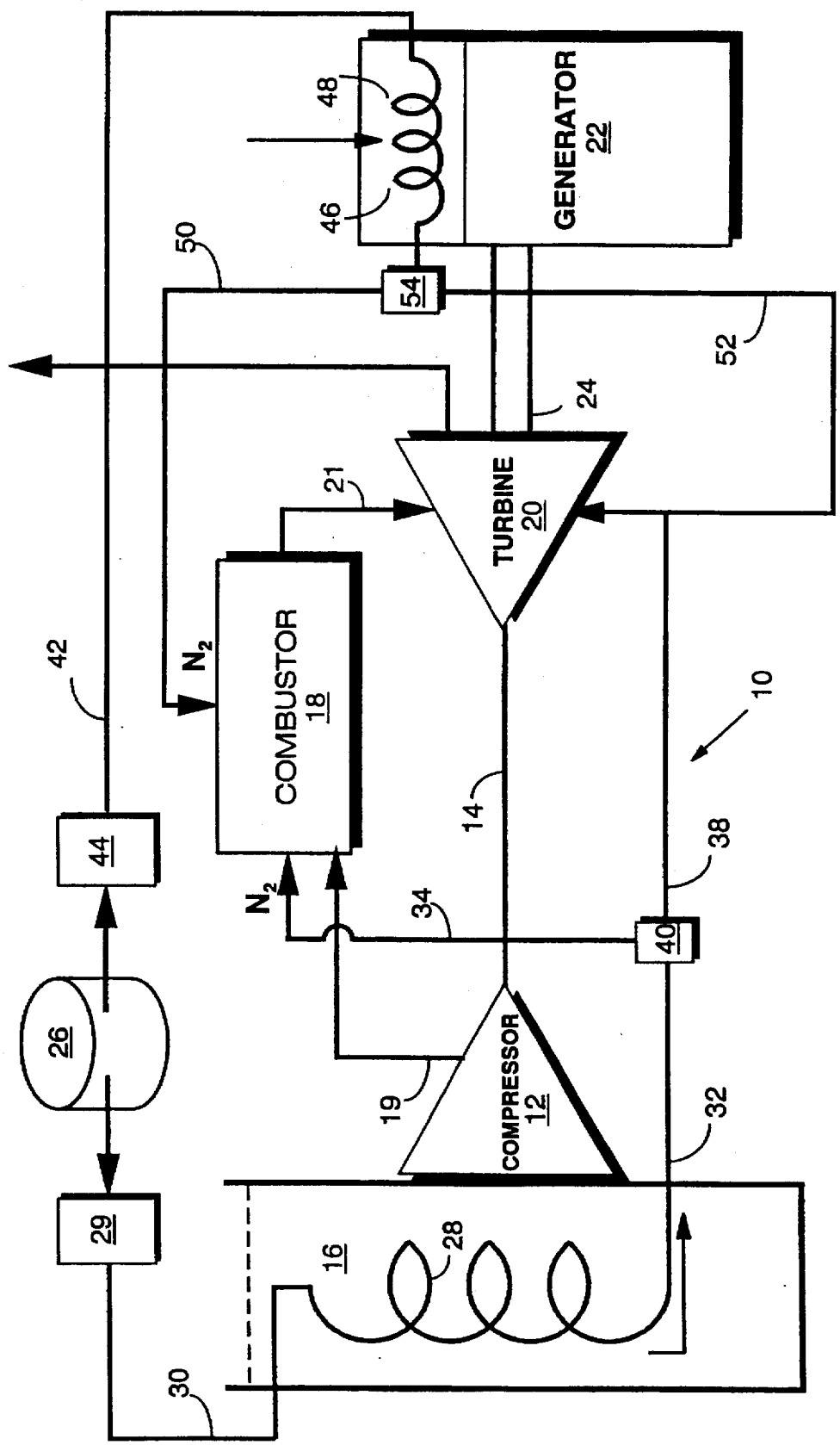
FIG. 1 is a schematic representation of a gas turbine operating system according to the present invention.

FIG. 1 schematically illustrates a simple cycle, single-shaft heavy-duty gas turbine 10 incorporating the present invention. The gas turbine may be considered as comprising a multi-stage axial flow compressor 12 having a rotor shaft 14. Air enters the compressor inlet 16, is compressed by the axial flow compressor 12 and then is discharged (schematically illustrated by line 19) to a combustor 18 where fuel, such as natural gas, is burned to provide high-energy combustion gases supplied (schematically illustrated by line 21) to the turbine section 20. In the turbine section 20, the energy of the hot gases is converted into work, some of which is used to drive the compressor 12 through shaft 14, with the remainder being available for useful work to drive a load such as a generator 22, by means of a rotor shaft 24 for producing electricity.

In accordance with the present invention, liquid nitrogen is supplied from a suitable source, e.g., tank 26 to cooling coils 28 preferably located in or adjacent to the inlet 16 of compressor 12, the liquid nitrogen being supplied via a pump 29 and line 30. By locating the coils 28 in the compressor air inlet, it will be appreciated that air supplied to the compressor and the liquid nitrogen lie in heat exchange relation with one another whereby the inlet air is cooled and the liquid nitrogen heated to turn into a gaseous state.

The nitrogen in gaseous form exhausted from the coils 28 is supplied to either the combustor 18 or to the turbine 20, or both. Thus, the gaseous nitrogen may be supplied to the combustor 18 via lines 32 and 34 to reduce the flame temperature in the combustor and hence reduce the formation of $NO_x$ with simultaneous increase in mass flow and hence power output. Alternatively, the gaseous nitrogen may be supplied via line 38 directly to the turbine section 20 to increase or augment the mass flow through the turbine section and hence increase gas turbine power output. It will be appreciated that the supply of gaseous nitrogen to both of the combustor and turbine section may be regulated or proportioned between the combustor and turbine section as needed. Further, the gaseous nitrogen, in either case, can be preheated with the additional heat being supplied, for example, from waste heat from the gas turbine compartment, exhaust or the like, to improve the heat rate. The additional heat augmentation is schematically illustrated at 40.

As illustrated, the turbine section 20 drives a generator 22. With the substantial increase in power output from the gas turbine, it is a feature of the present invention that the generator 22 also utilizes liquid nitrogen in heat exchange relation with the cooling system of the generator such that the generator in effect operates at a colder temperature and can accept the increased power output of the turbine. This enables the generator to increase its generation capacity. Therefore, in accordance with the present invention, liquid nitrogen is provided, for example, from tank 26 via line 42 and pump 44 to compressor 22 in heat exchange relation to the cooling system 46 of the generator. Thus, liquid nitrogen is supplied cooling coils 48 in heat exchange relation with the generator cooling system 46. Consequently, the operational temperature of the generator may be lowered below its normal operating temperature affording the generator increased capacity to accept the increased output from the gas turbine 10. Also, by placing the liquid nitrogen in heat exchange relation with the cooling system of the generator, the liquid nitrogen is heated and converts to its gaseous state. The gaseous nitrogen is then supplied either to the combustor 18 via line 50 to reduce $NO_x$ formation in the combustor or the turbine section via line 52 to improve mass flow through the turbine, or both, similarly as previously described. The gaseous nitrogen may also be heated using waste heat from the gas turbine, its exhaust and the like as schematically illustrated at 54.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a gas turbine having a compressor section, a combustor and a turbine section comprising the steps of:

disposing liquid nitrogen in heat exchange relation with air flowing through the compressor section to reduce the temperature of the air flowing therethrough and expand the liquid nitrogen to gaseous form; and supplying the gaseous nitrogen to at least one of (i) the combustor to reduce the formation of $NO_x$ within the combustor and (ii) the turbine section, thereby to increase gas turbine power output.

2. A method according to claim 1 including disposing the liquid nitrogen in an inlet to the compressor section whereby inlet air to the compressor is chilled by the liquid nitrogen.

3. A method according to claim 1 including supplying heat to the nitrogen, in addition to the heat supplied thereto by heat exchange with the air flowing though the compressor section, prior to supplying the gaseous nitrogen to said one of the combustor and turbine section.

4. A method according to claim 1 wherein the turbine is coupled to and drives a generator having a cooling system and including the steps of disposing liquid nitrogen in heat exchange relation with the cooling system of the generator to cool the generator and expand the liquid nitrogen to gaseous form; and supplying the gaseous nitrogen resulting from the heat exchange relation with the generator cooling system to at least one of (i) the combustor to reduce formation of $NO_x$ within the generator and (ii) the turbine section, thereby to increase turbine power output.

5. A method according to claim 4 including supplying heat to the nitrogen, in addition to the heat supplied thereto by heat exchange with the cooling system of the generator, prior to supplying the gaseous nitrogen to said one of the combustor and turbine section.

6. A method according to claim 1 including supplying the gaseous nitrogen to the combustor.

7. A method according to claim 1 including supplying the gaseous nitrogen to the turbine section.

8. A method of operating a power generating system including a generator and a gas turbine having a compressor section, a combustor and a turbine section coupled to the generator and wherein the generator has a cooling system comprising the steps of:

disposing liquid nitrogen in heat exchange relation with the cooling system of the generator to cool the generator and expand the liquid nitrogen to gaseous form; and supplying the gaseous nitrogen to at least one of (i) the combustor to reduce the formation of $NO_x$ within the combustor and (ii) the turbine section, thereby to increase gas turbine power output.

9. A method according to claim 1 including supplying heat to the nitrogen, in addition to the heat supplied thereto by heat exchange with the generator cooling system, prior to supplying the gaseous nitrogen to said one of the combustor and turbine section.

10. A method according to claim 8 including supplying the gaseous nitrogen to the combustor.

11. A method according to claim 8 including supplying the gaseous nitrogen to the turbine section.

12. A gas turbine comprising:

a compressor section;

a combustor for receiving compressed air from said compressor section;

a turbine section for receiving hot gases of combustion from said combustor;

a supply of liquid nitrogen;

a heat exchanger for receiving liquid nitrogen from said supply thereof and placing the liquid nitrogen in heat exchange relation with air flowing through said compressor section to reduce the temperature of the air flowing therethrough and expand the liquid nitrogen to gaseous form; and means for supplying the gaseous nitrogen to at least one of (i) said combustor to reduce the formation of $NO_x$ within said combustor and (ii) said turbine section, thereby to increase gas turbine power output.

13. A gas turbine according to claim 12 including an inlet to said compressor section, said heat exchanger being located in said inlet whereby inlet air to the compressor section is chilled by the liquid nitrogen.

14. A gas turbine according to claim 13 including a heat source for supplying heat to the nitrogen in addition to the heat supplied thereto by heat exchange with the air flowing through the compressor section, said heat source being disposed between said compressor inlet and said one of said combustor and said turbine section.

15. A gas turbine according to claim 12 including a generator having a cooling system, said turbine section being coupled to said generator, a heat exchanger for receiving liquid nitrogen from said supply thereof and placing the liquid nitrogen in heat exchange relation with the cooling system of the generator to cool the generator and expand the liquid nitrogen to gaseous form; and means for supplying the gaseous nitrogen from said generator cooling system to at least one of (i) said combustor to reduce formation of $NO_x$ within the combustor and (ii) said turbine section, thereby to increase turbine power output.

16. A gas turbine according to claim 15 including a heat source for supplying heat to the nitrogen in addition to the heat supplied thereto by heat exchange with the cooling system of the generator, said heat source being disposed between said cooling system and said one of said combustor and said turbine section.

17. A power generating system comprising:

a gas turbine having a compressor section, a combustor for receiving compressed air from said compressor section and a turbine section for receiving hot gases of combustion from said combustor;

a generator having a cooling system and coupled to said turbine section;

a supply of liquid nitrogen;

a heat exchanger for receiving liquid nitrogen from said supply thereof and placing the liquid nitrogen in heat exchange relation with the cooling system of the generator to cool the generator and expand the liquid nitrogen to gaseous form; and means for supplying the gaseous nitrogen to at least one of (i) said combustor to reduce the formation of $NO_x$ within said combustor and (ii) said turbine section, thereby to increase gas turbine power output.

18. A power generating system according to claim 17 including a heat source for supplying heat to the nitrogen in addition to the heat supplied thereto by heat exchange with the cooling system of said generator, said heat source being disposed between said cooling system and said one of said combustor and said turbine section.

* * * * *